United States Patent
Makela et al.

(10) Patent No.: US 7,428,466 B2
(45) Date of Patent: Sep. 23, 2008

(54) SELF-CORRECTING BAROMETER AND/OR ALTIMETER

(75) Inventors: Jakke Makela, Turku (FI); Pekka Naula, Piispanristi (FI); Terho Kaikuranta, Piispanristi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/153,240

(22) Filed: Jun. 15, 2005

(65) Prior Publication Data

US 2006/0000286 A1     Jan. 5, 2006

(30) Foreign Application Priority Data

Jun. 30, 2004    (GB)  ................................. 0414688.2

(51) Int. Cl.
G01L 7/00      (2006.01)
G01L 9/00      (2006.01)
G01L 11/00    (2006.01)

(52) U.S. Cl. .................................... 702/138

(58) Field of Classification Search .................. 702/98, 702/138, 158, 166; 73/31.04
See application file for complete search history.

(56) References Cited

U.S. PATENT DOCUMENTS

| | | | |
|---|---|---|---|
| 3,958,108 A * | 5/1976 | Shimomura ................... | 73/384 |
| 6,662,652 B1 * | 12/2003 | Ferrero et al. ................. | 73/387 |
| 2006/0212257 A1 * | 9/2006 | Makela et al. ............... | 702/138 |

* cited by examiner

Primary Examiner—Michael Nghiem
(74) Attorney, Agent, or Firm—Perman & Green, LLP

(57) ABSTRACT

Altimeters correct themselves by analyzing pressure data to identify underlying climatic changes and modify sensed pressures accordingly to provide corrected altitude values. The detected underlying climatic changes are used to provide a barometer function independent of altitude changes. Air pressure measured at a plurality of times is stored to provide historical pressure data. A reference pressure is modified in dependence on historical data to produce a modified reference pressure. An altitude value is obtained from the current air pressure value and the modified reference pressure and stored.

45 Claims, 15 Drawing Sheets

(a)

(b)

(c)

(d)

SELF-CORRECTING BAROMETER AND/OR ALTIMETER

CROSS-REFERENCE TO RELATED APPLICATIONS

This application claims priority from British Patent Application No. 0414688.2, filed on Jun. 30, 2004.

BACKGROUND OF THE INVENTION

The present invention relates to self-correction of barometers and altimeters and personal communication devices incorporating self-correcting barometers and/or altimeters.

Electronic and mechanical barometers and pressure-sensing altimeters are well-known. However, these devices all suffer from calibration problems when used in a mobile context.

Ambient air pressure changes with altitude and this phenomenon is the basis of the operation of pressure-sensing altimeters. However, this causes calibration problems for barometers which are mobile.

Air pressure changes by about 1 mbar per 10 m change in altitude. Air pressure changes of a few mbars per hour can also occur as a result of the movement of weather fronts. Consequently, there is a problem in distinguishing between pressure changes caused by changes in altitude and those caused by weather conditions.

In aviation applications, altimeters are calibrated from time to time by the aircrew using local mean sea-level pressure values received from air traffic control. However, there is no similar infrastructure for providing reference pressure values for personal devices.

BRIEF SUMMARY OF THE INVENTION

It is an object of the present invention to provide a barometer that can correct for altitude changes.

It is an object of the present invention to provide an altimeter that can correct for non-height related air pressure changes.

According to the present invention, there is provided a method of determining altitude barometrically, the method comprising:
  storing air pressure measured at a plurality of times to provide historical pressure data;
  modifying a reference pressure in dependence on said historical pressure data to produce a modified reference pressure; and
  obtaining an altitude value from a current air pressure value and said modified reference pressure.

The reference pressure may be modified by fitting a sine wave, having a period of 24 hours, to the historical pressure data, preferably for a period of 48 hours, and changing an initial reference pressure according to the sine wave and the timing of said current air pressure value. The historical pressure data at corresponding times of day may be averaged and the sine wave fitted to the historical pressure data averages.

The reference pressure is modified by fitting a line to the historical pressure data and changing an initial reference pressure according to the said line and the timing of said current air pressure value.

The reference pressure may also be modified by fitting a spline to the historical pressure data and changing an initial reference pressure according to the said line and the timing of said current air pressure value.

Preferably, the method includes:
  optionally setting an initial reference pressure value;
  determining whether a sensor, being used to provide said stored air pressures, is in motion;
  calculating a normalised differential value representing a pressure change between successive items of the historical pressure data; and
  modifying the reference pressure on the basis of said normalised differential value, preferably iteratively from an initial value,
  wherein the historical data comprises air pressures measured while the sensor is not significantly in motion.

The method may include setting an initial reference pressure and an initial altitude, wherein said altitude value is obtained from the difference between the current reference pressure, obtained by modifying the initial reference pressure, the current air pressure value and the initial altitude.

According to the present invention, there is also provided a barometric altimeter comprising:
  an air pressure sensor;
  a memory; and
  a processor,
  wherein the processor is configured for:
    storing air pressure measured by said sensor at a plurality of times as historical pressure data,
    modifying a reference pressure in dependence on said historical pressure data to produce a modified reference pressure, and
    calculating an altitude value from a current air pressure value obtained by said sensor and said modified reference pressure.

The processor may be configured to modify said reference pressure by fitting a sine wave, having a period of 24 hours, to the historical pressure data and changing an initial reference pressure according to the sine wave and the timing of said current air pressure value. The processor may also be configured to store pressures measured by said sensor such that said historical pressure data comprises air pressure values in a moving window of at least 48 hours duration. The processor may further be configured to average historical pressure data, produced by said sensor at corresponding times of day, and fit said sine wave is fitted to the historical pressure data averages.

The processor may be configured to modify the reference pressure by fitting a line to the historical pressure data and changing an initial reference pressure according to the said line and the timing of said current air pressure value.

The processor may be configured such that the reference pressure is modified by fitting a spline to the historical pressure data and changing an initial reference pressure according to the said line and the timing of said current air pressure value.

The altimeter may include:
  a motion sensor;
  wherein the processor is configured for:
    determining whether the altimeter is in motion in dependence on the output of the motion sensor;
    calculating a normalised differential value representing a pressure change between successive items of the historical pressure data;
    modifying the reference pressure on the basis of said normalised differential value, and
    storing only air pressures, measured while the sensor is determined not to be significantly in motion, as said historical pressure data.

The processor may be configured such that the reference pressure is modified iteratively from an initial value.

The altimeter may include input means with the processor being responsive to a signal from the input means to set an initial reference pressure value.

The altimeter may include input means with the processing means being configured for:
  responding to signals from the input means to setting an initial reference pressure and an initial altitude, wherein said altitude value is obtained from the difference between the current reference pressure, and
  calculating said altitude value from the difference between the current reference pressure, obtained by modifying the initial reference pressure, the current air pressure value and the initial altitude.

According to the present invention, there is provided a personal communication device comprising:
  a radio transceiver; and
  an altimeter according to the present invention.

According to the present invention, there is also provided a barometer comprising:
  a motion sensor;
  wherein the processor is configured for:
    determining whether the altimeter is in motion in dependence on the output of the motion sensor;
    calculating a normalised differential value representing a pressure change between successive items of the historical pressure data;
    modifying the reference pressure on the basis of said normalised differential value, and
    storing only air pressures, measured while the sensor is determined not to be significantly in motion, as said historical pressure data an air pressure sensor;
  a memory; and
  a processor,
  wherein the processor is configured for:
    storing air pressure measured by said sensor at a plurality of times as historical pressure data,
    modifying a reference pressure in dependence on said historical pressure data to produce a modified reference pressure, and
    calculating an altitude value from a current air pressure value obtained by said sensor and said modified reference pressure.

According to the present invention, there is provided a personal communication device comprising:
  a radio transceiver; and
  an barometer according to the present invention.

DETAILED DESCRIPTION OF THE INVENTION

Embodiments of the present invention will now be described, by way of example, with reference to the accompanying drawings.

FIRST EMBODIMENT

Figure 1:
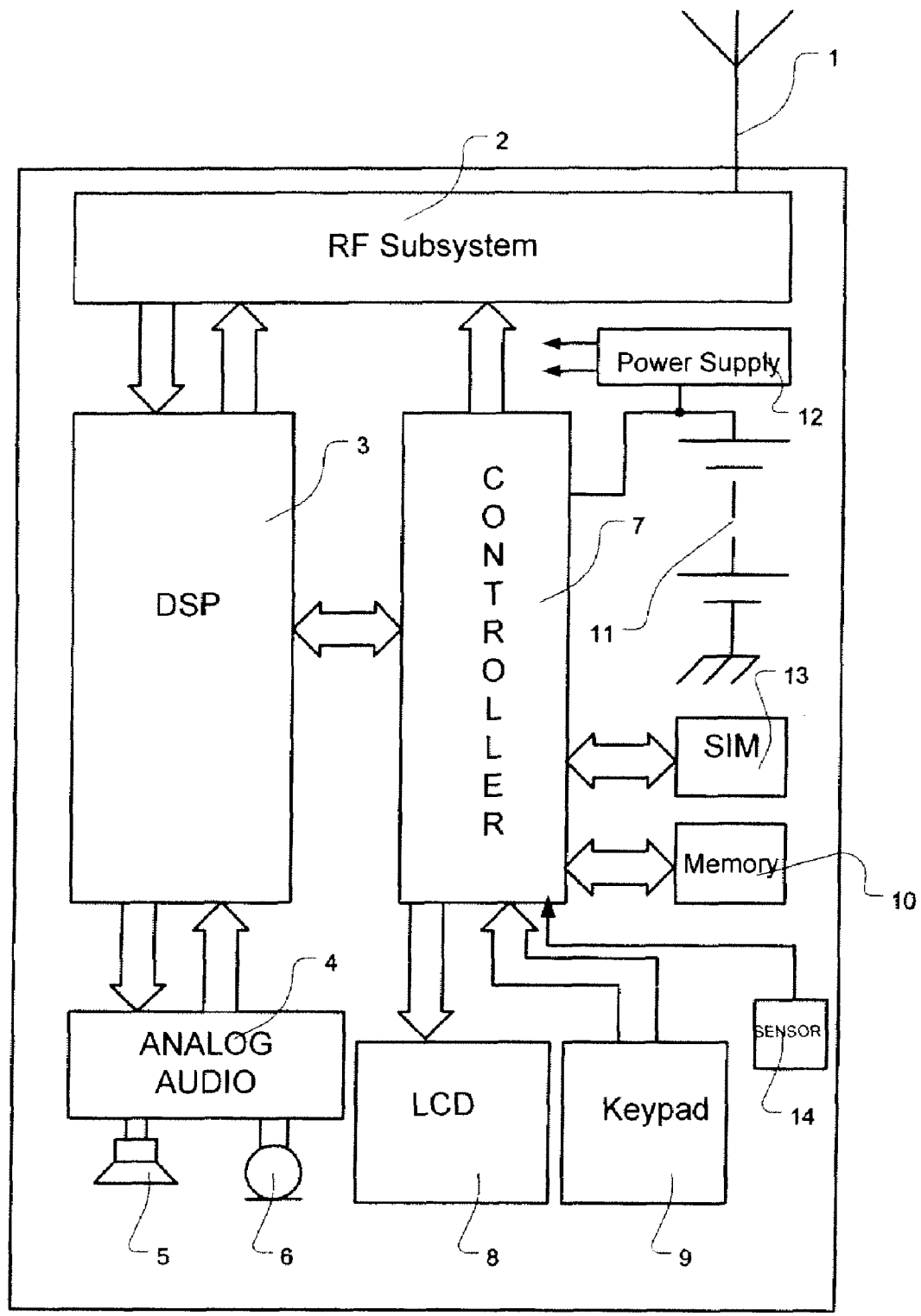
FIG. 1 is a block diagram of a first mobile phone embodying the present invention.

Referring to FIG. 1, a mobile phone, according to the present invention, comprises an antenna 1, an rf subsystem 2, a baseband DSP (digital signal processing) subsystem 3, an analog audio subsystem 4, a loudspeaker 5, a microphone 6, a controller 7, a liquid crystal display 8, a keypad 9, memory 10, a battery 11, a power supply circuit 12 and a SIM (subscriber identity module) 13 and a solid-state pressure sensor 14.

The rf subsystem 2 contains the rf circuits of the mobile phone's transmitter and receiver and a frequency synthesizer for tuning the mobile phone's transmitter and receiver. The frequency synthesizer include a variable crystal oscillator which provides a reference for the generation of other frequencies within the frequency synthesizer. The antenna 1 is coupled to the rf subsystem 2 for the reception and transmission of radio waves.

The baseband DSP subsystem 3 is coupled to the rf subsystem 2 to receive baseband signals therefrom and for sending baseband modulation signals thereto. The baseband DSP subsystems 3 includes codec functions which are well-known in the art.

The analog audio subsystem 4 is coupled to the baseband DSP subsystem 3 and receives demodulated audio therefrom. The analog audio subsystem 4 amplifies the demodulated audio and applies it to the loudspeaker 5. Acoustic signals, detected by the microphone 6, are pre-amplified by the analog audio subsystem 4 and sent to the baseband DSP subsystem 4 for coding.

The controller 7 controls the operation of the mobile phone 2. To this end, it is coupled to the rf subsystem 2 for supplying tuning instructions to the frequency synthesizer and to the baseband DSP subsystem for supplying control data and management data for transmission. The controller 7 operates according to a program stored in the memory 10 with reference to the contents of the SIM 13. The memory 10 is shown separately from the controller 7. However, it may be integrated with the controller 7.

The display device 8 is connected to the controller 7 for receiving control data and the keypad 9 is connected to the controller 7 for supplying user input data signals thereto.

The output of the pressure sensor 14 is connected to an input of the controller 7.

The memory 10 contains programs, which are run by the controller 7, to control the operation of the mobile phone. Among these programs are programs and routines for providing an altimeter function.

The memory 10 also contains city data representing a table mapping city name onto altitude and one of two modes, for example:

| City | Altitude | Mode |
|---|---|---|
| London | 14 m | Temperate |
| New York | 1 m | Temperate |
| Beijing | 63 m | Temperate |
| Caracas | 909 m | Tropical |
| Rio De Janiero | 10 m | Tropical |
| . | . | . |
| . | . | . |
| . | . | . |

The user can select the city, where they are currently located, using a settings function of the mobile phone.

In order to provide the user with an altitude value, the mobile phone monitors the ambient air pressure using the pressure sensor 14 at hourly intervals. The timing of the pressure readings is effected by a pressure read timer implemented by the controller 7.

Figure 2:
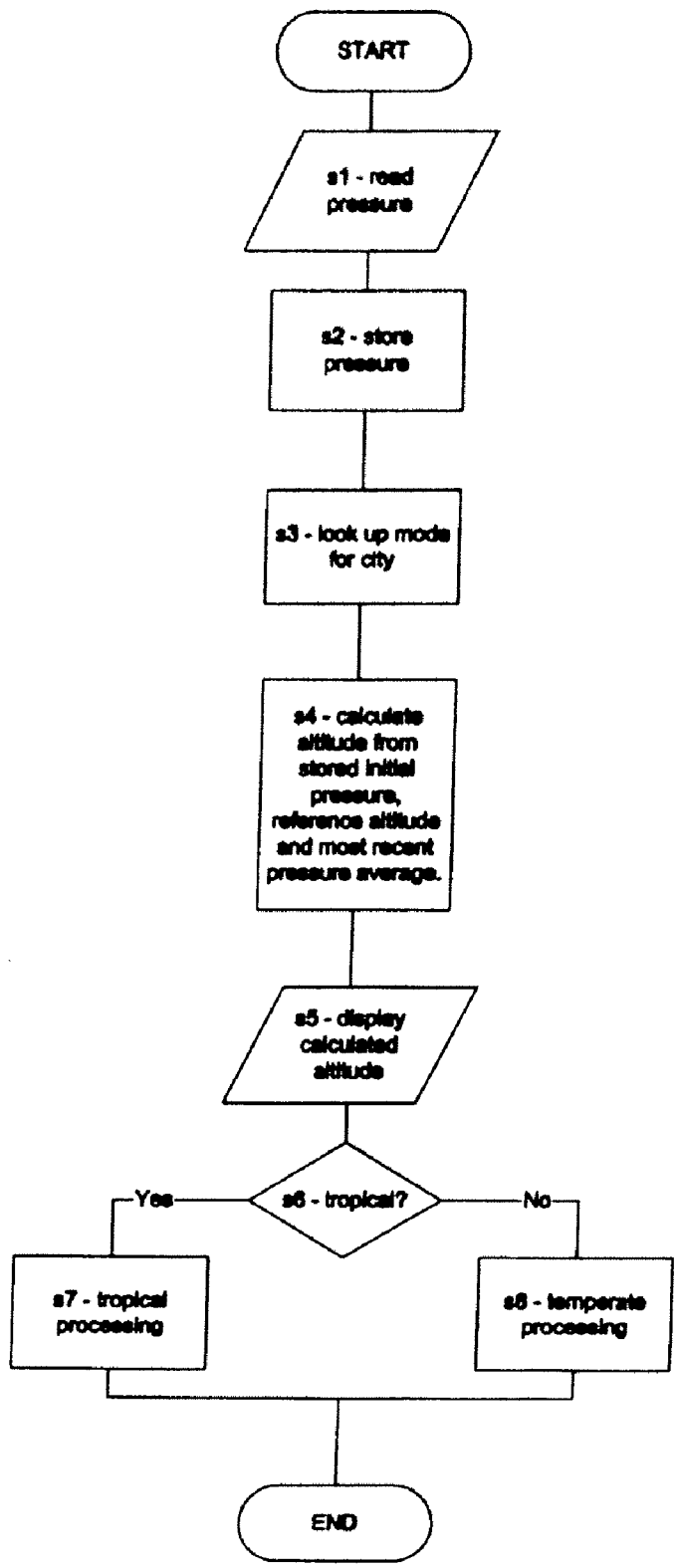
FIG. 2 is a flowchart of a pressure recording and altitude calculation process performed by the mobile phone shown in FIG. 1.

Referring to FIG. 2, when the pressure read timer times out, the controller 7 reads the output of the pressure sensor 14, step s1, and stores the read value in the memory 10, step s2. The values are stored as a 72-hour moving window.

The controller 7 then looks up the mode associated with the currently set city, step s3.

The controller 7 first calculates, step s4, an uncorrected altitude value and displays the calculated altitude, step s5. The uncorrected altitude, a, value is calculated according to the formula:

$$a = a_0 + k(p_0 - p_t)$$

where $a_0$ is the altitude of the currently set city, $p_0$ is the air pressure stored when the current city was set, $p_t$ is the most recent air pressure value, i.e. the most recent hourly pressure reading or $p_0$, if the city was set less than one hour previously and k is a constant. k is approximately 10 when $p_0$ and $P_t$ are in millibars.

A tropical process, step s7, or temperate process, step s8, is then performed according to the mode associated with the currently set city, step s6.

In equatorial regions, ambient air pressure follows a daily cycle as the air heats up during the day and cools down during the night. This daily cycle results in a simple barometric altimeter giving a cyclically changing altitude. In tropical and sub-tropical regions, a similar daily pattern is evident but is combined with longer term seasonal patterns. However, in both cases, the daily cycle can be used as the basis of meaningful altitude correction. Consequently, the same mode, labelled "tropical", is used for equatorial, tropical and sub-tropical regions.

Figure 3:
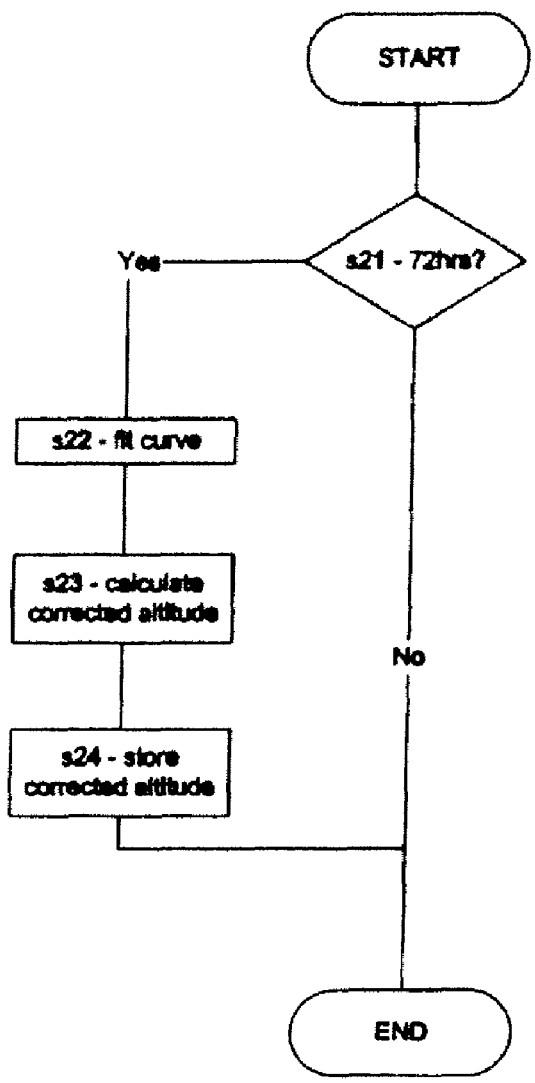
FIG. 3 is a flowchart of the tropical processing shown in FIG. 2.

Referring to FIG. 3, in the case of the tropical process s7, the stored hourly air pressure averages are used to correct for the daily pressure cycle. If pressure averages are available for 72 hours, step s21, a sinusoidal curve is fitted to the hourly pressure averages, step s22. The curve is of the form:

$$\pi(t) = \pi_0 \sin(\kappa(\tau - \tau_0))$$

Figure 4:
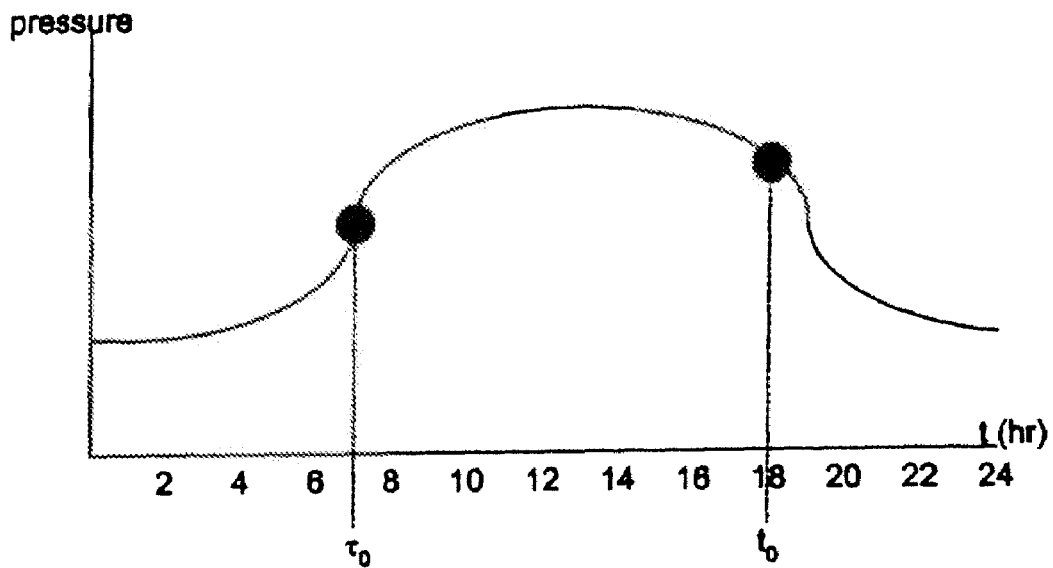
FIG. 4 is a plot illustrating daily air pressure cycling at an equatorial location.

Referring to FIG. 4, $\tau_0$ will generally be a point in time before the city was set at $t_0$. As a result a corrected reference air pressure, $p_0'$ at the current time, t, will be:

$$p'_0(t) = \pi_0 \sin(\kappa(t_0 + t - \tau_0))$$

Thus, in step s23, the value of $p_0'$ is calculated and then used to calculate the corrected altitude, in accordance with:

$$a = a_0 + k(p'_0 - p_t)$$

Then the corrected altitude is stored, step s24. However, if there is insufficient data for curve fitting at step s21, no corrected altitude value is stored.

In temperate regions, the ambient air pressure does not follow clear cyclical patterns and a different approach must be applied to correction of altitude.

Figure 5:
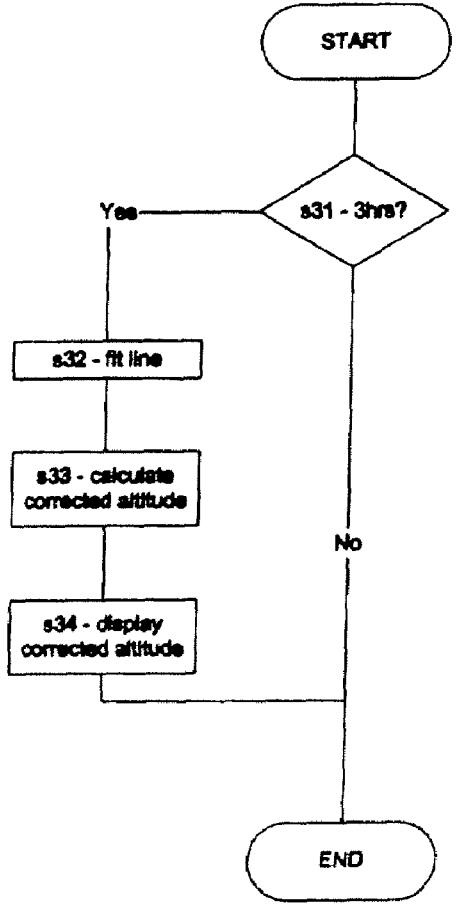
FIG. 5 is a flowchart of the temperate processing shown in FIG. 2.

Referring to FIG. 5, in the case of the temperate process s8, the most recent three stored hourly air pressure averages are used to correct the altitude. If pressure averages are available for three hours, step s31, a straight line is fitted to the hourly pressure readings, step s32.

The slope of the fitted straight line is then used, in step s33, to calculate a new modified reference pressure $P_0''$ is calculated according to:

$$p_0'' = m \cdot t \cdot p_0^{n-1}$$

where $p_0^{n-1}$ is the previous modified reference pressure or the originally sensed pressure when no modifications have yet been made, m is the slope of the line and t is the time since $p^{n-1}$ was established.

$p_0''$ then used to calculate the corrected altitude, in accordance with:

$$a = a_0 + k(p_0'' - p_t)$$

Then the corrected altitude is stored, step s34. However, if there is insufficient data for the line fitting at step s31, no corrected altitude value is stored.

Figure 6:
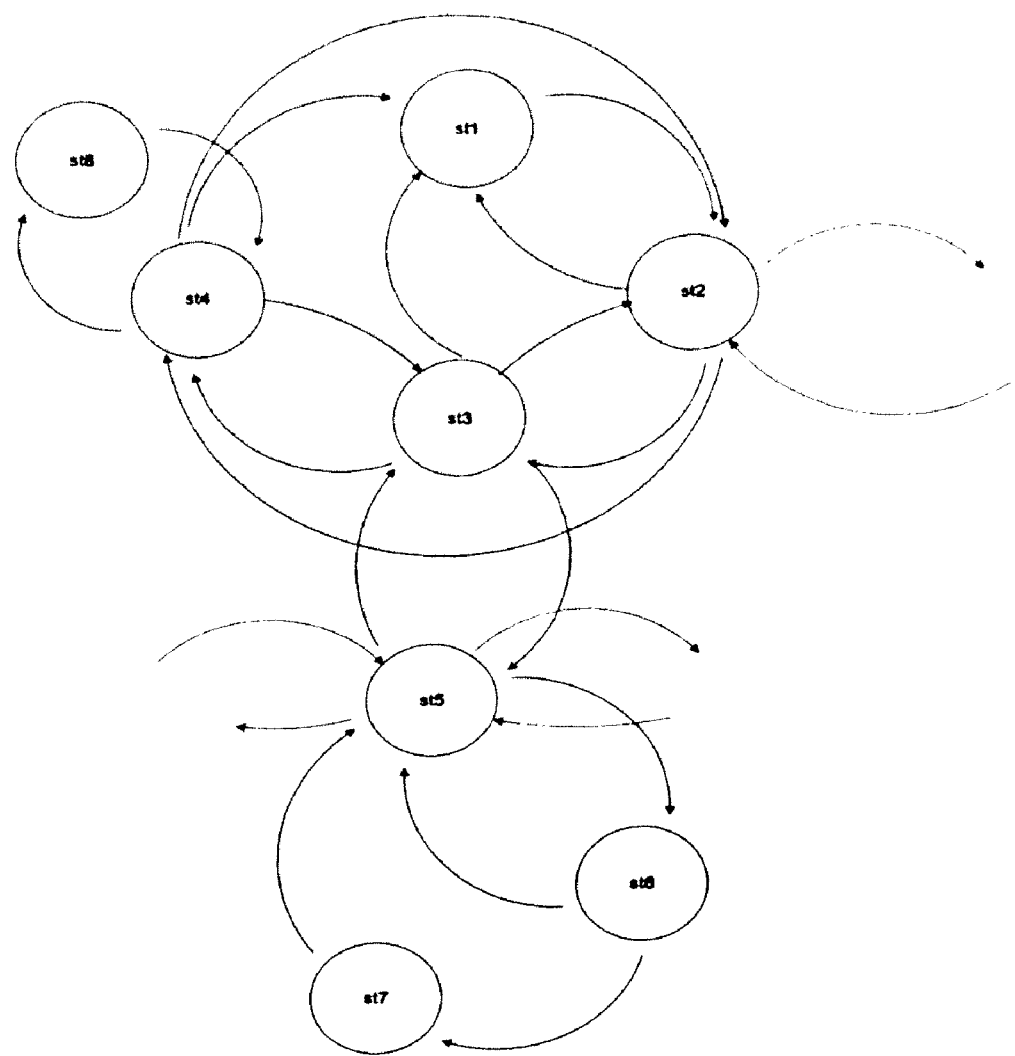
FIG. 6 is a state diagram representing part of the user interface of the mobile phone shown in FIG. 1.
Figure 7:
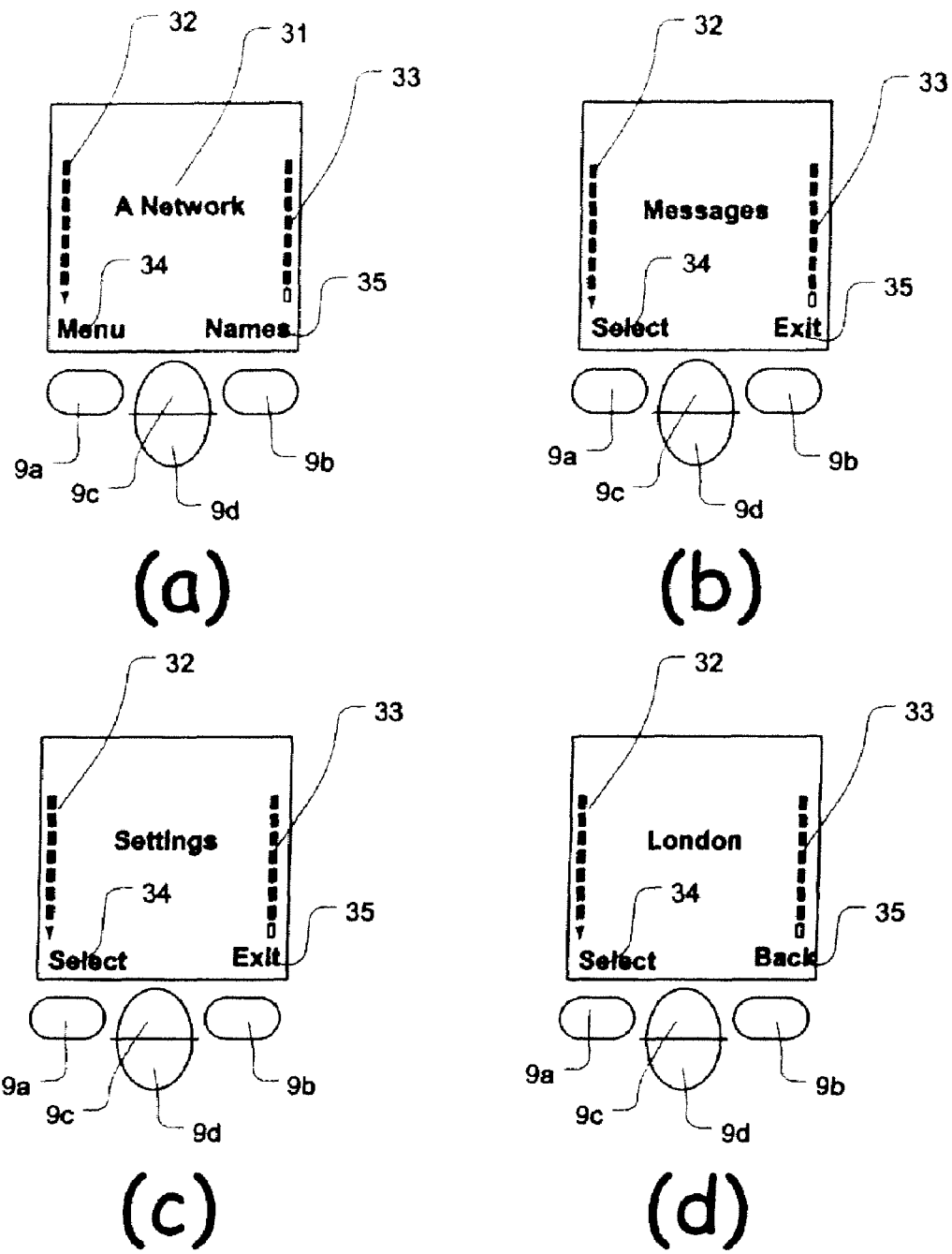
FIGS. 7(a) to 7(f) show the display and user interface navigation keys of the mobile phone shown in FIG. 1 with the mobile phone in various states.
Figure 7:
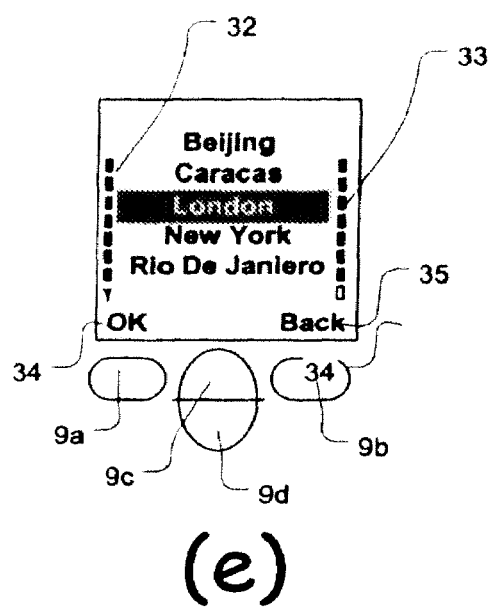
Figure 7:
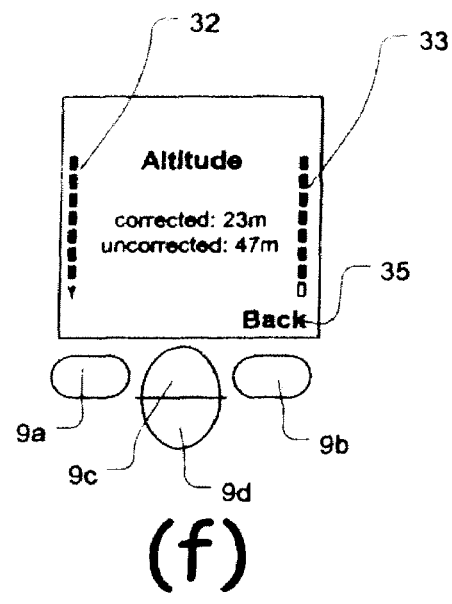

Referring to FIGS. 6 and 7(a), in a standby state st1, the mobile phone displays a legend 31, a signal strength indicator 32, a battery life indication 33, a first key mode function 34 and a second key function 35. The mobile phone's key pad 9 includes a left function key 9a, a right function key 9b, an up key 9c and a down key 9d for enabling a user to navigate the user interface displays. In the standby state st1, the legend is the a network id or some other text, the first key mode function 34 is "Menu" and the second key mode function 35 is "Names".

If the user presses the left function key 9a, when the mobile phone is in the standby state st1, the mobile phone moves to a messages start state st2 (FIG. 7(b)). In the messages start state st2, the legend 31 is "Messages", the first key mode function 34 is "Select" and the second key mode function 35 is "Exit". In this state, if the user presses the right function key 9b, the mobile phone returns to the standby state st1 and, if the user presses the left function key 9a, the mobile phone enters a first message option state (not show).

If the user presses up key 9c, the mobile phone moves to a settings start state st3 (FIG. 7©) Similarly, if the user presses the down key 9c, the mobile phone moves to an altimeter start state st4. The altimeter start state st4 can also be reached by pressing the up key 9c when the mobile phone is in the settings start state st3 and the settings start state st3 from the altimeter start state st4 by pressing the down key 9d.

As in the case of the messages start state st2, it is possible to return to the standby state st1 by pressing the right function key 9b when the mobile phone is in either of the settings and altimeter start states st3, st4.

If the user presses the left function key 9a when the mobile phone is in settings start state st3, the mobile phone moves to a city setting start state st5 (FIG. 7(d)). Pressing the up and down keys 9c, 9d when the mobile phone is in the city setting start state st5 will take the mobile phone to other setting start states (not shown).

Pressing the right function key 9b in the city setting start state st5 returns the mobile phone to the settings start state st3.

If the user presses the left function key 9a when the mobile phone is in the city setting start state st5, the mobile phone moves to a city setting state st6 (FIG. 7(e)) in which the user can select a city from the city data, stored in the memory 10 using the up and down keys 9c, 9d and then pressing the left function key 9a. If the user presses the right function key 9b, the mobile phone returns to the city setting start state st5 and the set city remains unchanged.

In response to pressing of the left function key 9a when the mobile phone is in the city setting state st6, the mobile phone moves to a city storing state st7 in which the selected city and the current sensed pressure are stored in the memory 10. When the selected city and current pressure have been stored, the mobile phone returns to the city setting start state st5.

If the user presses the left function key 9a when the mobile phone is in the altimeter start state st4, the mobile phone moves to an altimeter state st8 (FIG. 7(f)) in which the stored corrected altitude, if available, and the stored uncorrected altitude are displayed.

SECOND EMBODIMENT

A second mobile phone embodying the present invention is structurally the same as the first embodiment, described above. Most of the programs and routines, stored in the memory 10, are also the same. However, the tropical processing (step s7 in FIG. 2) and the temperate processing (step s8 in FIG. 2) are different.

Figure 8:
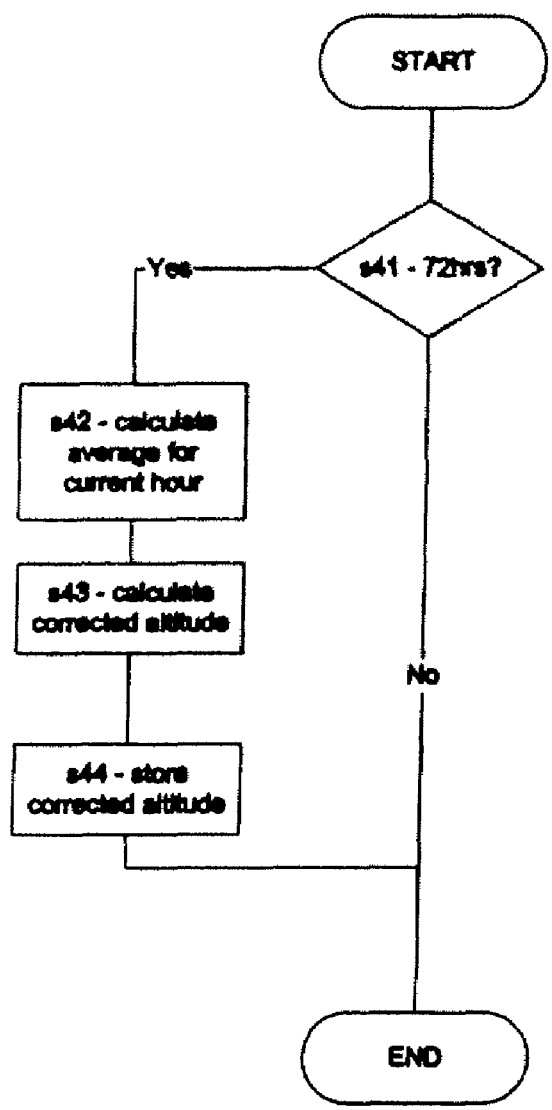
FIG. 8 is a flowchart of the tropical processing of a second embodiment.

Referring to FIG. 8, for tropical processing, step s7, it is determined whether there are 72 hours' worth of pressure readings in step s41. If there are not, no corrected altitude is displayed. However, if there are 72 hours' worth of pressure readings, an average of the readings corresponding to the present hour is calculated, step s42. For instance, if the current time is 14:30, the average of the pressure readings taken between 14:00:00 and 14:59:59 over the previous three days is taken.

The corrected altitude is then calculated, in step s43, according to:

$$a = a_0 + k(p_t - p'_0)$$

where $a_0$ is the altitude of the currently set city, $p'_0$ is the calculated average air pressure, $p_t$ is the most recent air pressure value, i.e. the most recent hourly pressure reading or $p_0$, if the city was set less than one hour previously and k is a constant. k is approximately 10 when $p'_0$ and $p_t$ are in millibars.

The corrected value, a, is then stored in step s44.

Figure 9:
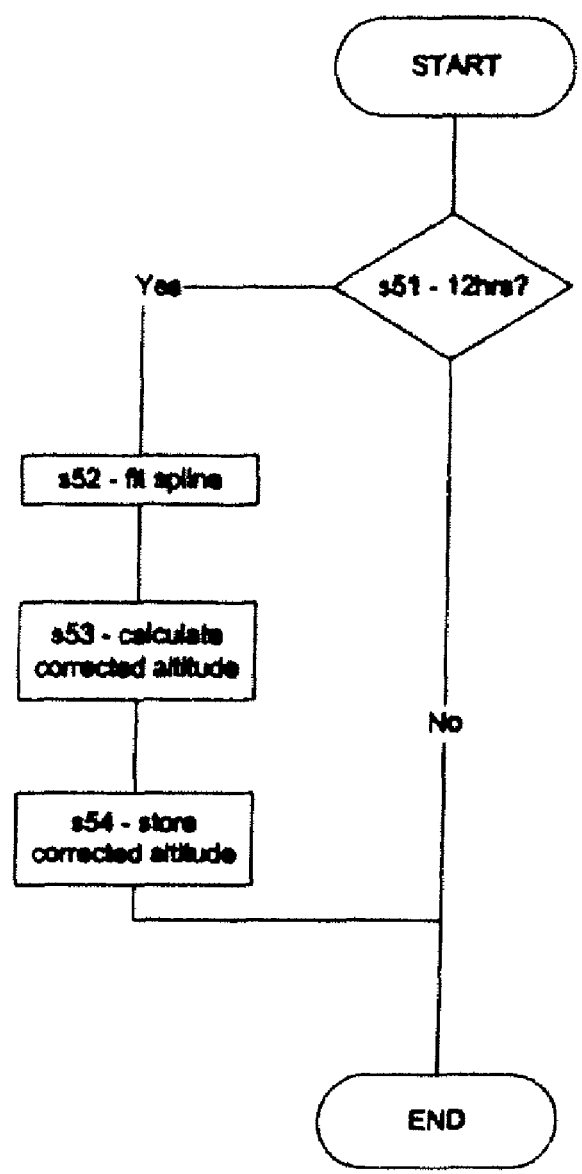
FIG. 9 is a flowchart of the temperate processing of the second embodiment.

Referring to FIG. 9, in the case of the temperate process step s8, the most recent 12 stored hourly air pressure readings are used to correct the altitude. If pressure averages are available for 12 hours, step s51, a spline is fitted to the hourly pressure readings, step s52.

The spline is then extrapolated to predict a reference air pressure $p'_0$ for the current time which is then used to calculate a corrected altitude, step s53.

Then the corrected altitude is stored, step s54. However, if there is insufficient data for the spline fitting at step s51, no corrected altitude value is stored.

THIRD EMBODIMENT

Figure 10:
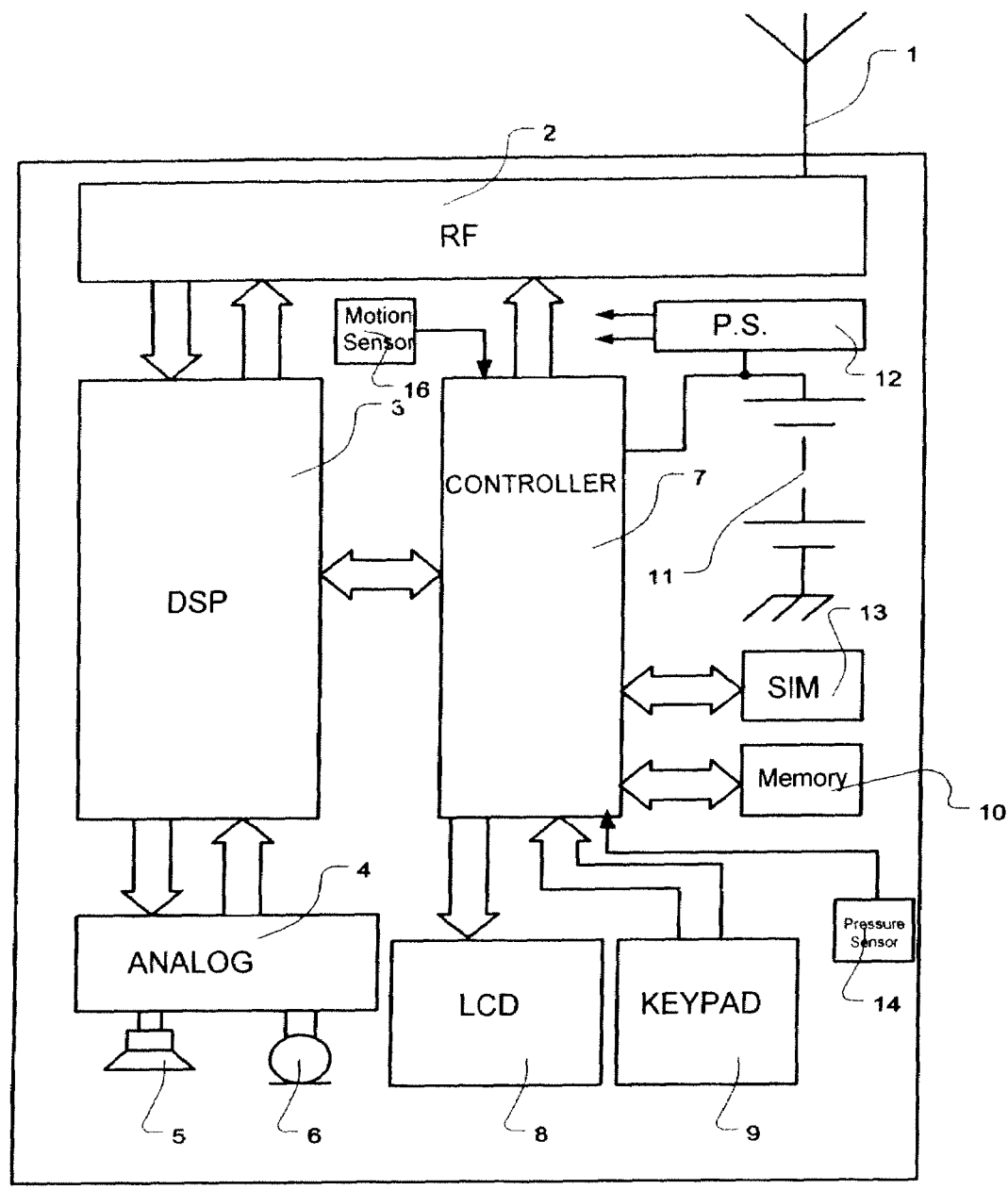
FIG. 10 is a block diagram of a third mobile phone according to the present invention.

Referring to FIG. 10, a third mobile phone, according to the present invention, comprises an antenna 1, an rf subsystem 2, a baseband DSP (digital signal processing) subsystem 3, an analog audio subsystem 4, a loudspeaker 5, a microphone 6, a controller 7, a liquid crystal display 8, a keypad 9, memory 10, a battery 11, a power supply circuit 12 and a SIM (subscriber identity module) 13, a solid-state pressure sensor 14 and a solid-state motion sensor 16.

The rf subsystem 2 contains the rf circuits of the mobile phone's transmitter and receiver and a frequency synthesizer for tuning the mobile phone's transmitter and receiver. The frequency synthesizer include a variable crystal oscillator which provides a reference for the generation of other frequencies within the frequency synthesizer. The antenna. 1 is coupled to the rf subsystem 2 for the reception and transmission of radio waves.

The baseband DSP subsystem 3 is coupled to the rf subsystem 2 to receive baseband signals therefrom and for sending baseband modulation signals thereto. The baseband DSP subsystems 3 includes codec functions which are well-known in the art.

The analog audio subsystem 4 is coupled to the baseband DSP subsystem 3 and receives demodulated audio therefrom. The analog audio subsystem 4 amplifies the demodulated audio and applies it to the loudspeaker 5. Acoustic signals, detected by the microphone 6, are pre-amplified by the analog audio subsystem 4 and sent to the baseband DSP subsystem 4 for coding.

The controller 7 controls the operation of the mobile phone 2. To this end, it is coupled to the rf subsystem 2 for supplying tuning instructions to the frequency synthesizer and to the baseband DSP subsystem for supplying control data and management data for transmission. The controller 7 operates according to a program stored in the memory 10 with reference to the contents of the SIM 13. The memory 10 is shown separately from the controller 7. However, it may be integrated with the controller 7.

The display device 8 is connected to the controller 7 for receiving control data and the keypad 9 is connected to the controller 7 for supplying user input data signals thereto.

The outputs of the pressure sensor 14 and the motion sensor 16 are connected to respective inputs of the controller 7.

The memory 10 contains, programs, which are run by the controller 7, to control the operation of the mobile phone. Among these programs are programs and routines for providing altimeter and barometer functions.

The memory 10 also contains city data representing a table mapping city name onto altitude and one of two modes, for example:

| City | Altitude | Mode |
| --- | --- | --- |
| London | 14 m | Temperate |
| New York | 1 m | Temperate |
| Beijing | 63 m | Temperate |
| Caracas | 909 m | Tropical |
| Rio De Janiero | 10 m | Tropical |
| . | . | . |
| . | . | . |
| . | . | . |

The user can select the city, where they are currently located, using a settings function of the mobile phone.

In order to provide the user with an altitude value, the mobile phone monitors the ambient air pressure using the pressure sensor 14 and its motion using the motion sensor 16 at 15 minute intervals. The timing of the pressure and motion readings is effected by a pressure read timer implemented by the controller 7.

Figure 11:
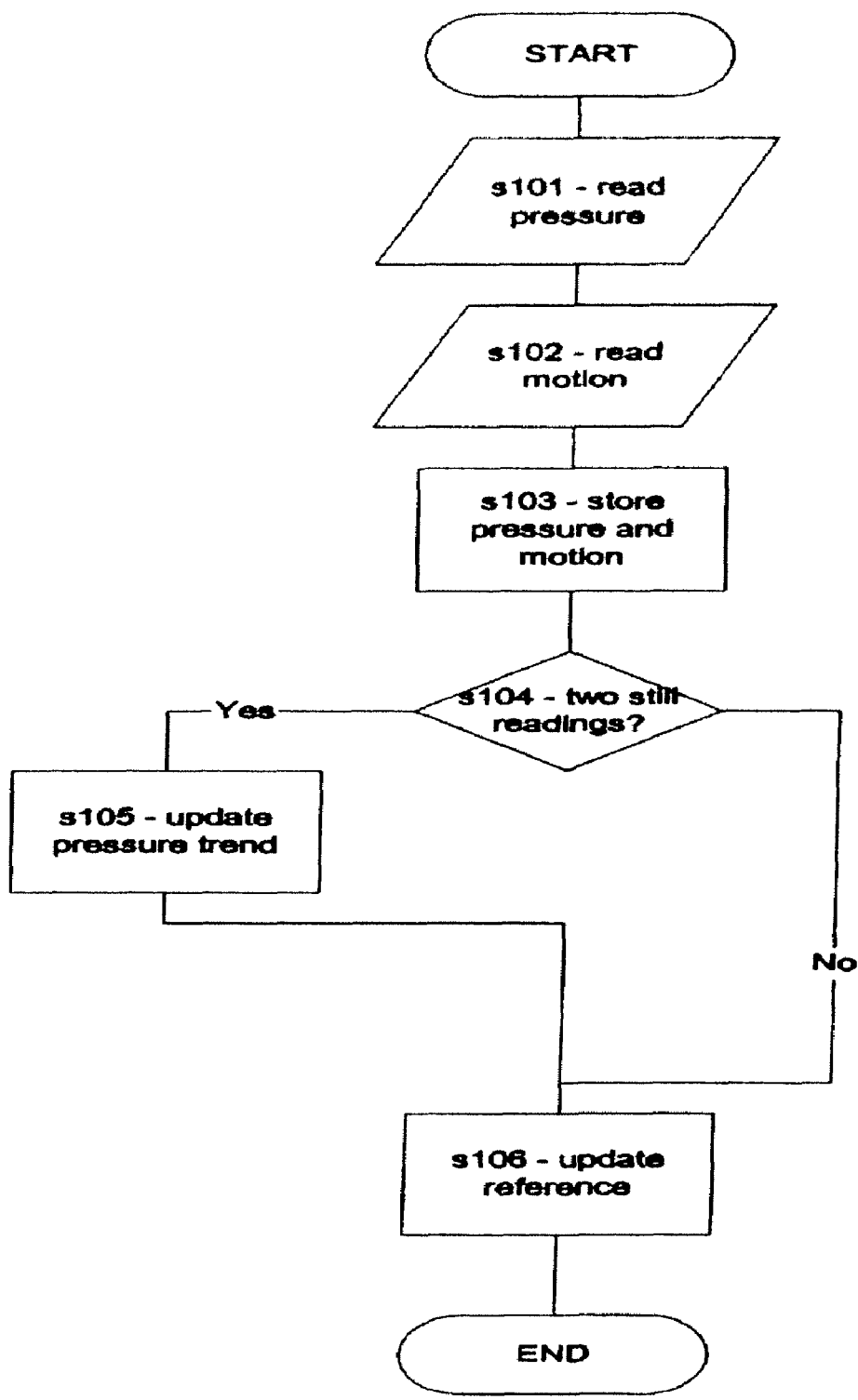
FIG. 11 is a flowchart of a pressure and motion recording and altitude calculation process performed by the mobile phone shown in FIG. 10.

Referring to FIG. 11, when the pressure and motion read timer times out, the controller 7 reads the output of the pressure sensor 14, step s101, and the output of the motion sensor, step s102. The read values, i.e. the pressure and true/false, are then stored, step s103.

The pressure readings are stored in two distinct sets according to whether the motion sensor output is true or false. A time stamp is stored in association with each pressure reading. A gap of more than 15 minutes between successive time stamps indicates the end of "in motion" and "still" pressure reading sequences. The data is stored in a 6-hour moving window.

If, at step s104, the mobile phone is "still" and the preceding "still" pressure reading was taken 15 minutes earlier, a pressure trend value is updated, step s105.

The pressure trend value indicates the rate of change of ambient air pressure and, being relative, is largely unaffected by altitude.

in step s105, the pressure trend is calculated in accordance with:

$$pt = \frac{p^n - p^{n-1}}{t \cdot p^{n-1}}$$

where pt is the pressure trend, $p^n$ is the most recent pressure reading, $p^{n-1}$ is the preceding pressure reading and t is the time between the readings. The new pressure trend value is stored.

Following calculation of the pressure trend, a reference pressure $p_0$ is updated, step s106, in accordance with:

$$p'_0 = p_0(1 + (t \cdot pt))$$

If, at step s104, it is not the case that the mobile phone is "still" and the preceding "still" pressure reading was taken 15 minutes earlier, the pressure trend value is not updated, although the reference pressure $p_0$ is updated, step s106, using the most recently stored pressure trend. The replaced reference pressure is retained so that there is always a record of reference pressures in the 6-hour moving window.

Figure 12:
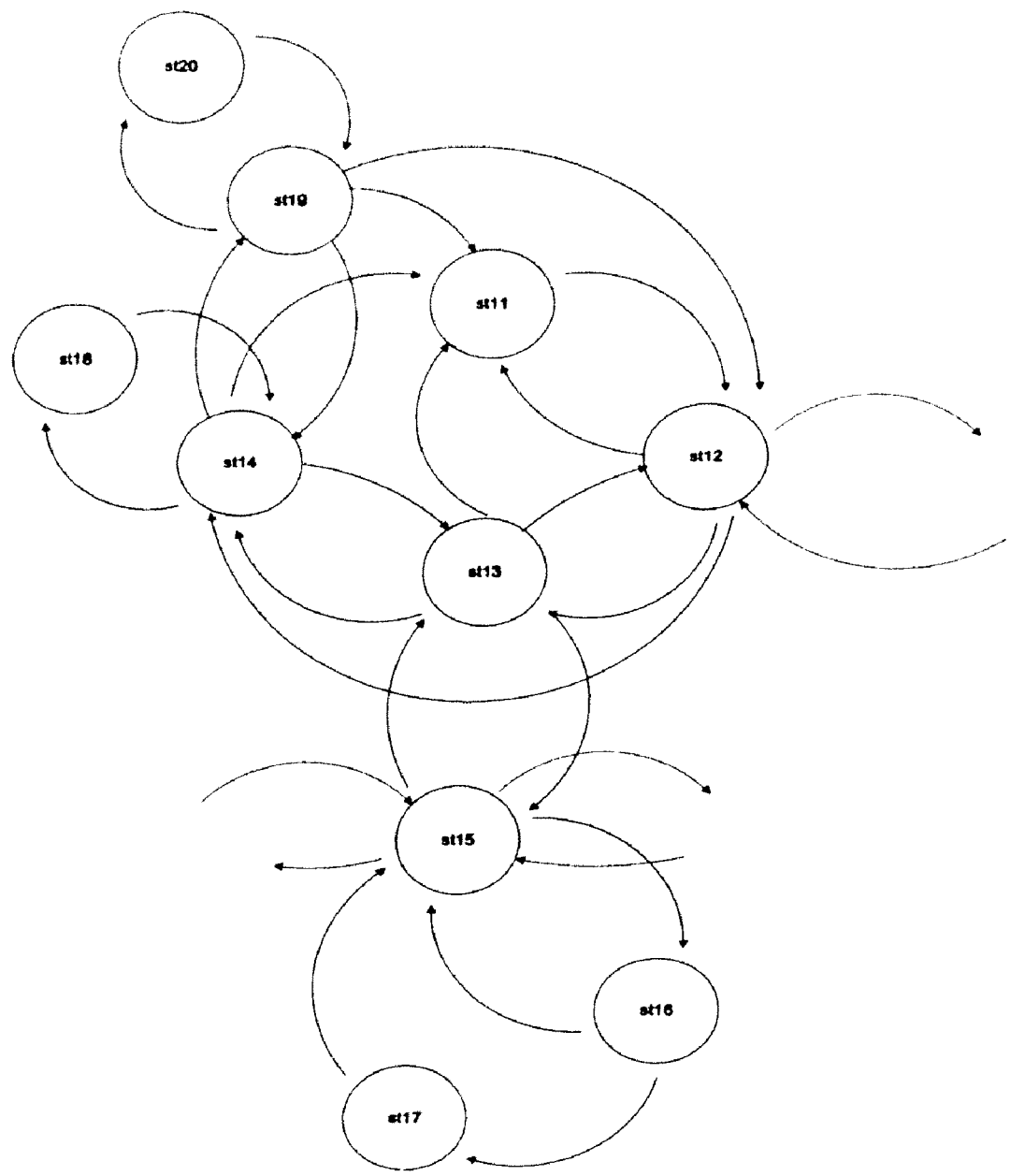
FIG. 12 is a state diagram representing part of the user interface of the mobile phone shown in FIG. 10.
Figure 13:
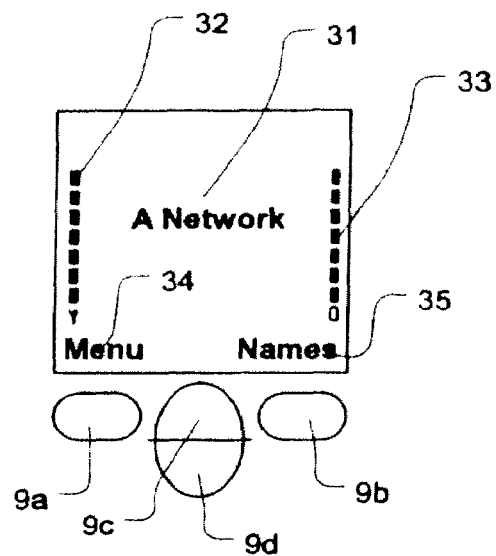
FIGS. 13(a) to 13(g) show the display and user interface navigation keys of the mobile phone shown in FIG. 10 with the mobile phone in various states.
Figure 13:
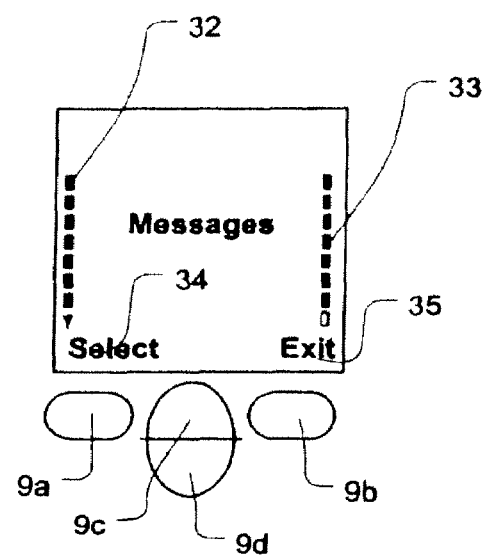
Figure 13:
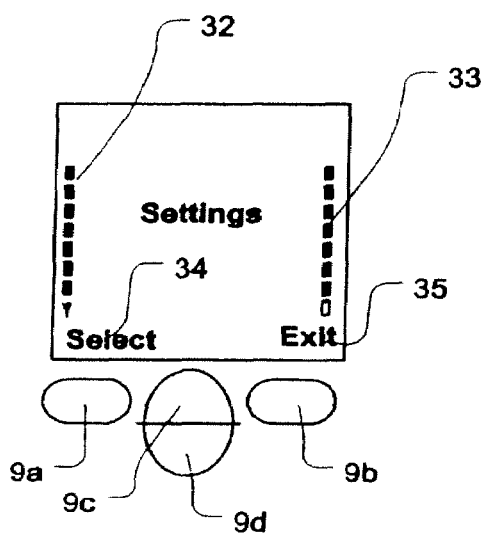
Figure 13:
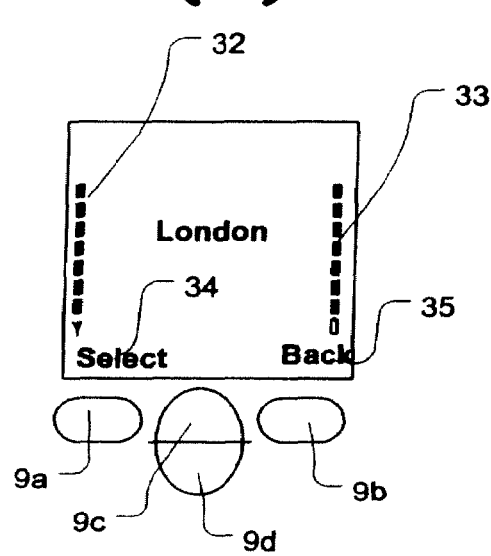
Figure 13:
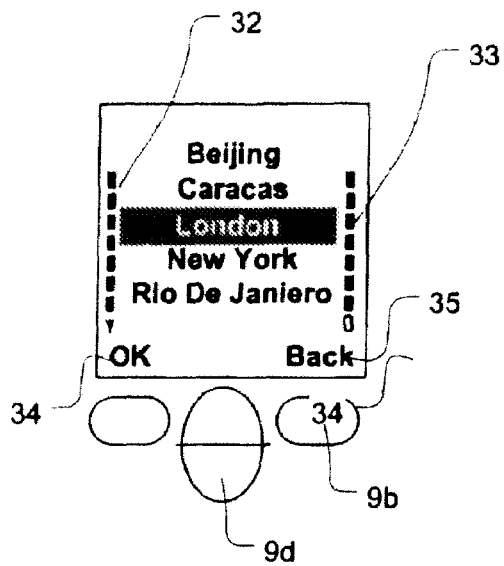
Figure 13:
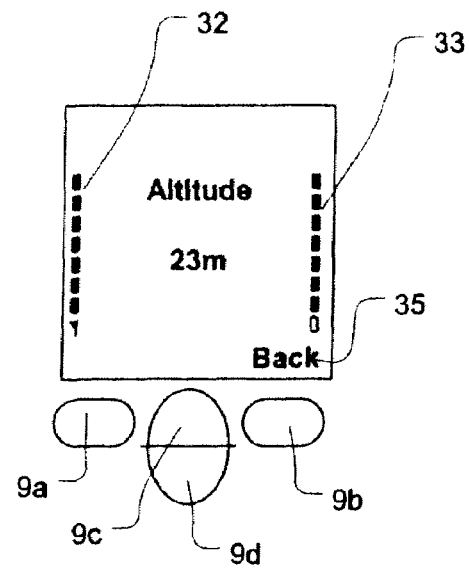
Figure 13:
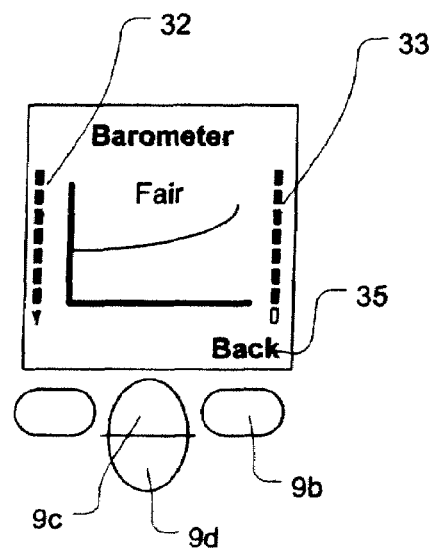

Referring to FIGS. 12 and 13(a), in a standby state st11, the mobile phone displays a legend 31, a signal strength indicator 32, a battery life indication 33, a first key mode function 34 and a second key function 35. The mobile phone's key pad 9 includes a left function key 9a, a right function key 9b, an up key 9c and a down key 9d for enabling a user to navigate the user interface displays. In the standby state st11, the legend is the a network id or some other text, the first key mode function 34 is "Menu" and the second key mode function 35 is "Names".

If the user presses the left function key 9a, when the mobile phone is in the standby state st11, the mobile phone moves to a messages start state st12 (FIG. 13(b)). In the messages start state st12, the legend 31 is "Messages", the first key mode function 34 is "Select" and the second key mode function 35 is "Exit". In this state, if the user presses the right function key 9b, the mobile phone returns to the standby state st1 and, if the user presses the left function key 9a, the mobile phone enters a first message option state (not show).

If the user presses up key 9c, the mobile phone moves to a settings start state st13 (FIG. 13(c)) Similarly, if the user presses the down key 9c, the mobile phone moves to an altimeter start state st14 and, if the user presses the down key 9c in the altimeter start state st14, the mobile phone moves to a barometer start state st19.

The barometer start state st19 can also be reached by pressing the up key 9c when the mobile phone is in the settings start state st13 and the settings start state st13 from the barometer start state st19 by pressing the down key 9d.

As in the case of the messages start state st12, it is possible to return to the standby state st11 by pressing the right function key 9b when the mobile phone is in any of the settings, altimeter and barometer start states st13, st14, st19.

If the user presses the left function key 9a when the mobile phone is in settings start state st13, the mobile phone moves to a city setting start state st15 (FIG. 13(d)). Pressing the up and down keys 9c, 9d when the mobile phone is in the city setting start state st15 will take the mobile phone to other setting start states (not shown).

Pressing the right function key 9b in the city setting start state st15 returns the mobile phone to the settings start state st13.

If the user presses the left function key 9a when the mobile phone is in the city setting start state st15, the mobile phone moves to a city setting state st16 (FIG. 13(e)) in which the user can select a city from the city data, stored in the memory 10 using the up and down keys 9c, 9d and then pressing the left function key 9a. If the user presses the right function key 9b, the mobile phone returns to the city setting start state st15 and the set city remains unchanged.

In response to pressing of the left function key 9a when the mobile phone is in the city setting state st16, the mobile phone moves to a city storing state st17 in which the selected city and the current sensed pressure are stored in the memory 10. The sensed pressure initialises the reference pressure $p_0$. When the selected city and current pressure have been stored, the mobile phone returns to the city setting start state st15.

If the user presses the left function key 9a when the mobile phone is in the altimeter start state st14, the mobile phone moves to an altimeter state st18 (FIG. 13(f)) in which a value for the current altitude is displayed.

Figure 14:
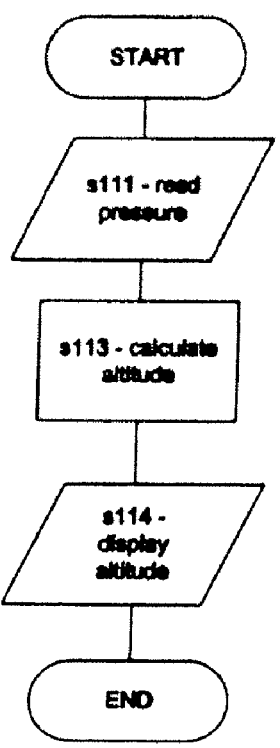
FIG. 14 is a flowchart of an altimeter function of the mobile phone shown in FIG. 10.

Referring to FIG. 14, when the mobile phone moves between the altimeter start state st14 and the altimeter state st18, the current pressure is first read, step s101. The altitude can then be calculated, step s102, using the most recent value for the reference pressure $p_0$ in accordance with:

$$a = a_0 + k(p - p_0)$$

where $a_0$ is the altitude stored in association with the currently selected city, p is the most recent pressure reading and k is a constant.

The calculated altitude a is then displayed (FIG. 13(f)) in step s103.

Figure 15:
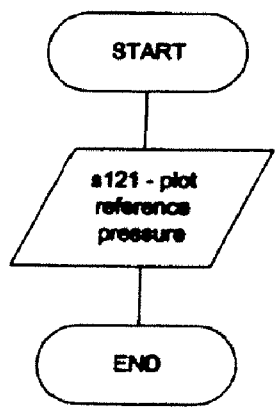
FIG. 15 is a flowchart of a barometer function of the mobile phone shown in FIG. 10.

Referring to FIG. 15, when the mobile phone moves between the barometer start state st19 and the barometer state s20, the reference pressure values in the 6-hour moving window are plotted on the mobile phone's display 8 (FIG. 13(g)). A suitable label, e.g. "Stormy", "Rain", "Change", "Fair" or "Very Dry", is also displayed to indicate the expected weather. The label is selected on the basis of the form of the reference pressure plot and, optionally, the currently set city.

In an alternative embodiment, a facsimile of a mechanical barometer may be displayed in the barometer state st20.

It will be appreciated that many modification may be made to the embodiments described above.

The invention claimed is:

1. A method of determining altitude barometrically, the method comprising:
   storing air pressure measured at a plurality of times to provide historical pressure data;
   modifying a reference pressure in dependence on said historical pressure data to produce a modified reference pressure, wherein the reference pressure is modified by fitting a sine wave, having a period of 24 hours, to the historical pressure data and changing an initial reference pressure according to the sine wave and a timing of a current air pressure value; and
   obtaining an altitude value from the current air pressure value and said modified reference pressure, and storing the altitude value as the barometrically determined altitude.

2. A method according to claim 1, wherein said historical pressure data comprises air pressure values for a period of 48 hours or more.

3. A method according to claim 2, wherein the historical pressure data at corresponding times of day is averaged and the sine wave is fitted to the historical pressure data averages.

4. A method according to claim 1, including setting an initial reference pressure value.

5. A method according to claim 1, including setting an initial reference pressure and an initial altitude, wherein said altitude value is obtained from the difference between the current reference pressure, obtained by modifying the initial reference pressure, the current air pressure value and the initial altitude.

6. A barometric altimeter comprising:
   an air pressure sensor;
   a memory; and
   a processor;
   wherein the processor is configured for:
      storing air pressure measured by said sensor at a plurality of times as historical pressure data;
      modifying a reference pressure in dependence on said historical pressure data to produce a modified reference pressure by fitting a sine wave, having a period of 24 hours, to the historical pressure data and changing an initial reference pressure according to the sine wave and a timing of a current air pressure value7; and
      calculating an altitude value from the current air pressure value obtained by said sensor and said modified reference pressure.

7. A barometric altimeter according to claim 6, wherein the processor is configured to store pressures measured by said sensor such that said historical pressure data comprises air pressure values in a moving window of at least 48 hours duration.

8. A barometric altimeter according to claim 7, wherein the processor is configured to average historical pressure data, produced by said sensor at corresponding times of day, and fit said sine wave is fitted to the historical pressure data averages.

9. A barometric altimeter according to claim 6, including input means, wherein the processor is responsive to a signal from the input means to set an initial reference pressure value.

10. A barometric altimeter according to claim 6, including input means, wherein the processing means is configured for:
    responding to signals from the input means to setting an initial reference pressure and an initial altitude, wherein said altitude value is obtained from the difference between the current reference pressure, and
    calculating said altitude value from the difference between the current reference pressure, obtained by modifying the initial reference pressure, the current air pressure value and the initial altitude.

11. A personal communication device comprising:
    a radio transceiver;
    an air pressure sensor;
    a memory; and
    a processor;
    wherein the processor is configured for:
       storing air pressure measured by said sensor at a plurality of times as historical pressure data;
       modifying a reference pressure in dependence on said historical pressure data to produce a modified reference pressure by fitting a sine wave, having a period of 24 hours, to the historical pressure data and changing an initial reference pressure according to the sine wave and a timing of a current air pressure value; and
       calculating an altitude value from the current air pressure value obtained by said sensor and said modified reference pressure.

12. A device according to claim 11, wherein the processor is configured to store pressures measured by said sensor such that said historical pressure data comprises air pressure values in a moving window of at least 48 hours duration.

13. A device according to claim 12, wherein the processor is configured to average historical pressure data, produced by said sensor at corresponding times of day, and fit said sine wave is fitted to the historical pressure data averages.

14. A device according to claim 11, including input means, wherein the processor is responsive to a signal from the input means to set an initial reference pressure value.

15. A device according to claim 11, including input means, wherein the processing means is configured for:
    responding to signals from the input means to set an initial reference pressure and an initial altitude, wherein said altitude value is obtained from the difference between the current reference pressure; and
    calculating said altitude value from the difference between the current reference pressure, obtained by modifying the initial reference pressure, the current air pressure value and the initial altitude.

16. A barometer comprising:
    a motion sensor;
    an air pressure sensor;
    a memory; and
    a processor;
    wherein the processor is configured for:
       storing air pressure measured by said sensor at a plurality of times as historical pressure data;
       modifying a reference pressure in dependence on said historical pressure data to produce a modified reference pressure;
       calculating an altitude value from a current air pressure value obtained by said sensor and said modified reference pressure;
       determining whether the altimeter is in motion in dependence of an output of the motion sensor;
       calculating a normalised differential value representing a pressure change between successive items of the historical pressure data;
       modifying the reference pressure on the basis of said normalized differential value; and
       storing only air pressures, measured while the sensor is determined not to be significantly in motion, as said historical pressure data.

17. A personal communication device comprising:
    a radio transceiver; and
    a barometer according to claim 16.

18. A method of determining altitude barometrically, the method comprising:
  storing air pressure measured at a plurality of times to provide historical pressure data;
  modifying a reference pressure in dependence on the historical pressure data to produce a modified reference pressure, wherein the reference pressure is modified by fitting a line to the historical pressure data and changing an initial reference pressure according to the line and a timing of a current air pressure value; and
  obtaining an altitude value from the current air pressure value and the modified reference pressure, and storing the altitude value as the barometrically determined altitude.

19. A method according to claim 18, wherein the historical pressure data at corresponding times of day is averaged and the line is fitted to the historical pressure data averages.

20. A method of determining altitude barometrically, the method comprising:
  storing air pressure measured at a plurality of times to provide historical pressure data;
  modifying a reference pressure in dependence on the historical pressure data to produce a modified reference pressure, wherein the reference pressure is modified by fitting a spline to the historical pressure data and changing an initial reference pressure according to the spline and a timing of a current air pressure value; and
  obtaining an altitude value from the current air pressure value and the modified reference pressure, and storing the altitude value as the barometrically determined altitude.

21. A method according to claim 20, wherein the historical pressure data at corresponding times of day is averaged and the spline is fitted to the historical pressure data averages.

22. A method of determining altitude barometrically, the method comprising:
  storing air pressure measured at a plurality of times to provide historical pressure data;
  determining whether a sensor, being used to provide the stored air pressures, is in motion;
  calculating a normalised differential value representing a pressure change between successive items of the historical pressure data;
    modifying a reference pressure in dependence on the historical pressure data to produce a modified reference pressure, wherein the reference pressure is modified on the basis of the normalised differential value and the historical data comprises air pressures measured while the sensor is not significantly in motion; and
  obtaining an altitude value from a current air pressure value and the modified reference pressure, and storing the altitude value as the barometrically determined altitude.

23. A barometric altimeter comprising:
  an air pressure sensor;
  a memory; and
  a processor;
  wherein the processor is configured to:
    store air pressure measured by the sensor at a plurality of times as historical pressure data;
    modify a reference pressure in dependence on the historical pressure data to produce a modified reference pressure, wherein the reference pressure is modified by fitting a line to the historical pressure data and changing an initial reference pressure according to the line and a timing of a current air pressure value; and
    calculate an altitude value from the current air pressure value obtained by the sensor and the modified reference pressure.

24. A barometric altimeter according to claim 23, wherein the processor is configured to average historical pressure data, produced by the sensor at corresponding times of day, and fit the line to the historical pressure data averages.

25. A barometric altimeter according to claim 24, wherein the reference pressure is modified iteratively from an initial value.

26. A barometric altimeter according to claim 23, including input means, wherein the processor is responsive to a signal from the input means to set an initial reference pressure value.

27. A barometric altimeter according to claim 23, including input means, wherein the processing means is configured to:
  respond to signals from the input means to set an initial reference pressure and an initial altitude, wherein the altitude value is obtained from the difference between the current reference pressure; and
  calculate the altitude value from the difference between the current reference pressure, obtained by modifying the initial reference pressure, the current air pressure value and the initial altitude.

28. A barometric altimeter comprising:
  an air pressure sensor;
  a memory; and
  a processor;
  wherein the processor is configured to:
    store air pressure measured by the sensor at a plurality of times as historical pressure data;
    modify a reference pressure in dependence on the historical pressure data to produce a modified reference pressure, wherein the reference pressure is modified by fitting a spline to the historical pressure data and changing an initial reference pressure according to the spline and a timing of a current air pressure value; and
    calculate an altitude value from the current air pressure value obtained by the sensor and the modified reference pressure.

29. A barometric altimeter according to claim 28, wherein the processor is configured to average historical pressure data, produced by the sensor at corresponding times of day, and fit the spline to the historical pressure data averages.

30. A barometric altimeter according to claim 28, including input means, wherein the processor is responsive to a signal from the input means to set an initial reference pressure value.

31. A barometric altimeter according to claim 28, including input means, wherein the processing means is configured to:
  respond to signals from the input means to set an initial reference pressure and an initial altitude, wherein the altitude value is obtained from the difference between the current reference pressure; and
  calculate the altitude value from the difference between the current reference pressure, obtained by modifying the initial reference pressure, the current air pressure value and the initial altitude.

32. A barometric altimeter comprising:
  a motion sensor;
  an air pressure sensor;
  a memory; and
  a processor;
  wherein the processor is configured to:
    determine whether the altimeter is in motion in dependence on an output of the motion sensor;
    store air pressure measured by the sensor at a plurality of times as historical pressure data, wherein only air pressures measured while the sensor is determined not to be significantly in motion are stored as the historical pressure data;

calculate a normalised differential value representing a pressure change between successive items of the historical pressure data;

modify a reference pressure on the basis of the normalised differential value in dependence on the historical pressure data to produce a modified reference pressure; and calculate an altitude value from a current air pressure value obtained by the sensor and the modified reference pressure.

33. A barometric altimeter according to claim 32, including input means, wherein the processor is responsive to a signal from the input means to set an initial reference pressure value.

34. A barometric altimeter according to claim 32, including input means, wherein the processing means is configured to:

respond to signals from the input means to set an initial reference pressure and an initial altitude, wherein the altitude value is obtained from the difference between the current reference pressure; and calculate the altitude value from the difference between the current reference pressure, obtained by modifying the initial reference pressure, the current air pressure value and the initial altitude.

35. A personal communication device comprising:
a radio transceiver;
an air pressure sensor;
a memory; and
a processor;
wherein the processor is configured to:
store air pressure measured by the sensor at a plurality of times as historical pressure data;
modify a reference pressure in dependence on the historical pressure data to produce a modified reference pressure, wherein the reference pressure is modified by fitting a line to the historical pressure data and changing an initial reference pressure according to the line and a timing of a current air pressure value; and
calculate an altitude value from the current air pressure value obtained by the sensor and the modified reference pressure.

36. A device according to claim 35, including input means, wherein the processor is responsive to a signal from the input means to set an initial reference pressure value.

37. A device according to claim 35, including input means, wherein the processing means is configured to:

respond to signals from the input means to set an initial reference pressure and an initial altitude, wherein the altitude value is obtained from the difference between the current reference pressure; and calculate the altitude value from the difference between the current reference pressure, obtained by modifying the initial reference pressure, the current air pressure value and the initial altitude.

38. A personal communication device comprising:
a radio transceiver;
an air pressure sensor;
a memory; and
a processor;
wherein the processor is configured to:
store air pressure measured by the sensor at a plurality of times as historical pressure data;
modify a reference pressure in dependence on the historical pressure data to produce a modified reference pressure, wherein the reference pressure is modified by fitting a spline to the historical pressure data and changing an initial reference pressure according to the spline and a timing of a current air pressure value; and
calculate an altitude value from the current air pressure value obtained by the sensor and the modified reference pressure.

39. A device according to claim 38, wherein the processor is configured such that the reference pressure is modified iteratively from an initial value.

40. A device according to claim 38, including input means, wherein the processor is responsive to a signal from the input means to set an initial reference pressure value.

41. A device according to claim 38, including input means, wherein the processing means is configured to:

respond to signals from the input means to set an initial reference pressure and an initial altitude, wherein the altitude value is obtained from the difference between the current reference pressure; and calculate the altitude value from the difference between the current reference pressure, obtained by modifying the initial reference pressure, the current air pressure value and the initial altitude.

42. A personal communication device comprising:
a motion sensor;
a radio transceiver;
an air pressure sensor;
a memory; and
a processor;
wherein the processor is configured to:
determine whether the altimeter is in motion in dependence on an output of the motion sensor;
store air pressure measured by the sensor at a plurality of times as historical pressure data, wherein only air pressures measured while the sensor is determined not to be significantly in motion are stored as the historical pressure data;
calculate a normalised differential value representing a pressure change between successive items of the historical pressure data;
modify a reference pressure on the basis of the normalised differential value in dependence on the historical pressure data to produce a modified reference pressure; and
calculate an altitude value from a current air pressure value obtained by the sensor and the modified reference pressure.

43. A device according to claim 42, including input means, wherein the processor is responsive to a signal from the input means to set an initial reference pressure value.

44. A device according to claim 42, including input means, wherein the processing means is configured to:

respond to signals from the input means to set an initial reference pressure and an initial altitude, wherein the altitude value is obtained from the difference between the current reference pressure; and calculate the altitude value from the difference between the current reference pressure, obtained by modifying the initial reference pressure, the current air pressure value and the initial altitude.

45. A device according to claim 44, wherein the processor is configured such that the reference pressure is modified iteratively from an initial value.

* * * * *